(12) United States Patent
Long

(10) Patent No.: US 6,651,386 B2
(45) Date of Patent: Nov. 25, 2003

(54) EMERGENCY GATE OPENING APPARATUS

(76) Inventor: Homer C. Long, 1304 E. Commodore Pl., Tempe, AZ (US) 85283

( * ) Notice: Subject to any disclaimer, the term of this patent is extended or adjusted under 35 U.S.C. 154(b) by 0 days.

(21) Appl. No.: 09/904,128

(22) Filed: Jul. 13, 2001

(65) Prior Publication Data

US 2003/0009944 A1 Jan. 16, 2003

(51) Int. Cl.⁷ .......................... E05F 15/00; E05B 65/10; F16D 9/00
(52) U.S. Cl. .................. 49/141; 49/139; 403/2
(58) Field of Search ........................... 49/141, 139, 50, 49/140, 49, 280; 403/2; 256/73; 52/98, 99

(56) References Cited

U.S. PATENT DOCUMENTS

| | | | | |
|---|---|---|---|---|
| 3,394,498 A | * | 7/1968 | Reinitz et al. | 49/141 |
| 4,313,281 A | * | 2/1982 | Richmond | 49/139 X |
| 4,403,449 A | * | 9/1983 | Richmond | 49/139 X |
| 5,219,969 A | * | 6/1993 | Uhl et al. | 49/141 |
| 5,855,443 A | * | 1/1999 | Faller et al. | 403/2 |
| 5,884,732 A | * | 3/1999 | Anger et al. | 49/49 |
| 6,032,329 A | * | 3/2000 | Casali | 49/139 |
| 6,212,825 B1 | * | 4/2001 | Hopkins, Jr. | 49/49 |

* cited by examiner

*Primary Examiner*—Daniel P. Stodola
*Assistant Examiner*—Hugh B. Thompson

(57) ABSTRACT

A gate opening device for shifting a gate from a closed position to an open position on loss of power to a motive device includes a housing, the motive device carried by the housing, and a drive shaft coupled to and rotatable by the motive device. A drive member is coupled to the drive shaft and capable of being connected to a gate for causing shifting movement thereof. A base plate is coupled to the drive shaft and a drive plate is coupled to the drive member and pivotally coupled to the base plate. A shear pin engages the drive plate and the base plate, preventing relative pivoting thereof. The shear pin is formed of a material which allows a shearing effect on a specified torque or force, causing the shear pin to break or shear and allow relative pivotal movement of the drive plate and the base plate.

7 Claims, 3 Drawing Sheets

EMERGENCY GATE OPENING APPARATUS

BACKGROUND OF THE INVENTION

1. Field of the Invention

This invention relates in general to certain new and useful improvements in gate-opening and closing apparatus and more particularly, to gate-opening and closing apparatus and methods therefore which shift a gate between an open and closed position and which also permits overriding by operatively disconnecting a drive member from a motive means during a power outage.

2. Brief Description of the Prior Art

In recent years, there have been a number of gate opening and closing assemblies and particularly, automatic type opening and closing assemblies. These gate assemblies have received increasing prominence in many commercial applications. There are several types of gates which are moved from a closed position to an open position in order to provide access and back to a closed position in order to provide a type of security. One type of gate has one vertical side portion thereof hingedly mounted so that the other vertical side portion is swingable away from a stationary structure to an open position and back toward the stationary structure to a closed position.

Another one of the problems encountered with gates and the associated opening and closing apparatus is that of security. Typically, after the gate has been shifted to a closed position, there must be some type of positive locking action in order to prevent unauthorized opening of the gate. Finally, in the event of an emergency condition, such as a power failure, there must be some provision for overriding the entire apparatus so as to permit manual opening and closing of the gate.

In U.S. Pat. No. 4,159,599 dated Jul. 3, 1979, there is provided a gate opening and closing assembly which is designed to shift a gate in a linear path between closed and open positions. This gate opening and closing assembly also used a drive motor along with a gear operable drive mechanism for rotating a pair of lever arms in order to shift a gate between the closed and open positions. A manually operable override mechanism was provided in this apparatus, although the override mechanism deals with the disengagement of a clutch.

The present invention obviates these and other problems in the provision of a gate opening and closing apparatus and method which is provided with an override means such that a drive member can be automatically disconnected from a motor and substantially simultaneously therewith the locking mechanism can be opened in order to permit emergency manual opening and closing of the gate.

OBJECTS OF THE INVENTION

It is, therefore, a primary object of the present invention to provide an improved gate-opening and closing apparatus having an override mechanism such that a drive member may be disconnected from a source of power.

It is another object of the present invention to provide an apparatus of the type stated which includes a manually operable release mechanism mounted on top of a drive housing and a drive member which permits coupling to a gate located on the other side of the housing and which thereby enables simple and rugged construction of the apparatus.

It is a further object of the present invention to provide an improved type of gate opening and closing apparatus of the type stated in which a drive shaft is utilized to manually open a gate on loss of power.

It is still another object of the present invention to provide an emergency gate-opening apparatus of the type stated which can be manufactured at a relatively low unit cost and which is highly efficient and reliable in its operation.

It is still a further object of the present invention to provide an emergency gate opening apparatus of the type stated which is constructed so that it requires a minimum amount of space and further, can be mounted in a wide variety of positions relative to a gate so as to be unobtrusively located relative thereto.

It is another salient object of the present invention to provide a method of opening a gate with a motive means along with an emergency override system which allows for manual disconnect of a drive member from the motor and substantially opens a locking mechanism therefor.

With the above and other objects in view, my invention resides in the novel features of form, construction, arrangement, and combination of parts presently described and pointed out in the claims.

DESCRIPTION

SUMMARY OF THE DISCLOSURE

An apparatus for shifting a gate from a closed position to an open position on emergency from loss of power to a motive means. The apparatus generally comprises a housing along with a motive means, such as an electric motor, operatively associated with the housing. A drive member is operatively connected to the motive means and is capable of being connected to a gate for causing shifting movement of the gate. Typically the drive member is connected to the motive means by means of a drive shaft which extends from the housing.

The apparatus comprises a manually operable release member which is operatively connected to the locking mechanism and to the drive member. The release member functions as part of an override means and is capable of disengaging a drive shaft from the drive member, operatively disconnecting the drive member from the motive means, and more particularly disconnecting the drive member from the drive shaft.

In one embodiment of the invention, the locking mechanism uses a locking pin or locking rod. The locking pin or locking rod is adapted to be essentially operable with the energization of the motor so as to move the drive member with the locking rod to form a locking position with the drive member. When the motor is de-energized, the locking pin or locking rod is adaptable to shear and disengage the drive member from the motive means thereby permitting the gate to be opened manually.

As indicated above, the drive member is effectively operatively disconnected from the motive means when the locking pin or locking rod is sheared and the gate is actuated manually. This may be accomplished by means of an actuating plate mounted on the motive means base which axially turns to open the gate in relationship to the drive shaft. Consequently, the drive shaft is disengaged from the motive means and allows for rotation of the gate drive shaft disengaged from the drive means and allow manual opening of the gate on loss of electrical power. Thus, when the release mechanism is actuated by shearing of the locking pin or locking rod, the actuating shaft would be displaced axially from the motive means and thereby allow the gate drive shaft to displace and allow manual movement or opening of the security gate.

In another embodiment of the invention, the release member may be manually operable as aforesaid and may be located on top of the housing with respect to the drive shaft. Thus the drive shaft will be located on top of the housing on a base plate which fits on top of the motive drive plate which rotatably moves axially to extend the drive shaft and open the security gate. This is advantageous in that it provides a safety feature on loss of electrical power for access of fire department vehicles or emergency vehicles in general. The gate is therefore not locked in position from loss of electrical power to the motive means of the gate operator drive shaft. Moreover, by locating the drive plate with the locking pin or locking rod on top of the motive means housing and with respect to the release means being an inexpensive nylon locking pin or locking rod, the construction is greatly simplified and in addition, cost of construction is substantially reduced. This is all enabled by the use of the drive shaft and the concentrically located actuating shaft which is capable of being axially shiftable within the drive shaft to axially displace the drive shaft and actuate the gate manually.

The release member preferably comprises a drive plate and a base plate mounted on top of the gate operator housing. The drive plate is adapted to fit a locking pin or locking rod and a permanent bolt to maintain the drive plate mounted on the base plate on the housing of the motive drive mechanism. On loss of electrical power to the motive drive mechanism, the drive plate is subject to manual force which shears the locking pin thereby allowing pivotal movement of the drive plate on the permanent bolt connecting the drive plate and base plate of the motive drive housing and allowing the gate to open. The locking pin is fabricated from a soft nylon or polyethylene material of specified shear strength to allow normal gate closure and opening in regular use. On loss of electrical power to the motive drive mechanism, it may be necessary to allow emergency vehicles into an area secured by the utility gate and a specific manual force can be applied to the gate itself, transferring this force to the housing of the motive drive mechanism by the drive shaft. The drive plate is supported onto a base plate of the motive drive mechanism by two supporting members, a permanent bolt and a soft material shear locking pin. The force transmitted by the drive shaft will apply axially onto the motive drive mechanism plate thereby causing the shear locking pin to shear and allow axial movement of the plate, thereby releasing the gate and allow entry into the secured area. The force on the gate will allow rotation into a release position and allow entry into the secured space. The shearing of the locking pin is adapted to cause an axial displacement of the actuating rod to thereby operatively disconnect the drive shaft, when the release shear locking pin is sheared in two and the gate is shifted to the override open position.

A normal configuration of a motive drive mechanism includes a top plate which supports the gate drive shaft. Axial rotation of the top motive drive plate guides the gate into an open or closed position by the motive drive mechanism. The present invention provides for a second plate which fits the configuration of the first motive drive plate. The top plate is drilled or fitted with two circular holes to allow penetration of the shear locking pin in the first hole and a threaded bolt in the second hole. The shear locking pin is also threaded to fit into the second plate. The two threaded fittings on the second plate allow for a secure connection of the plates to transfer axial movement from the first plate driven by the motive drive mechanism to the second plate which is connected to the drive shaft of the motive drive mechanism. The two plates are engageably connected to interact as one plate and thereby transfer the axial movement of the motive drive mechanism. The first and second plates are designed so as to cooperate with each other. The first threaded hole on the first plate will fit the shear locking pin and the second threaded hole will fit the permanent engaging bolt to secure the second plate to the first plate. The motive drive mechanism will turn the first plate in an axial motion with the second plate following the same motion from the motive drive mechanism. Consequently, when the first plate is rotated, the total mount of displacement is transmitted to the second plate which is engaged with the motive drive mechanism drive shaft. The motion of the motive drive mechanism is transferred to the motive drive mechanism drive shaft and thereby moves the gate into an open or closed position.

This invention possess many other advantages and has other purposes which may be made more clearly apparent from a consideration of the forms in which it may be embodied. These forms are shown in the drawings forming and accompanying part of the present specification. They will now be described in detail for the purposes of illustrating the general principals of the invention, but it is to be understood that such detailed descriptions are not to be taken in a limiting sense.

BRIEF DESCRIPTION OF THE DRAWINGS

Figure 1:
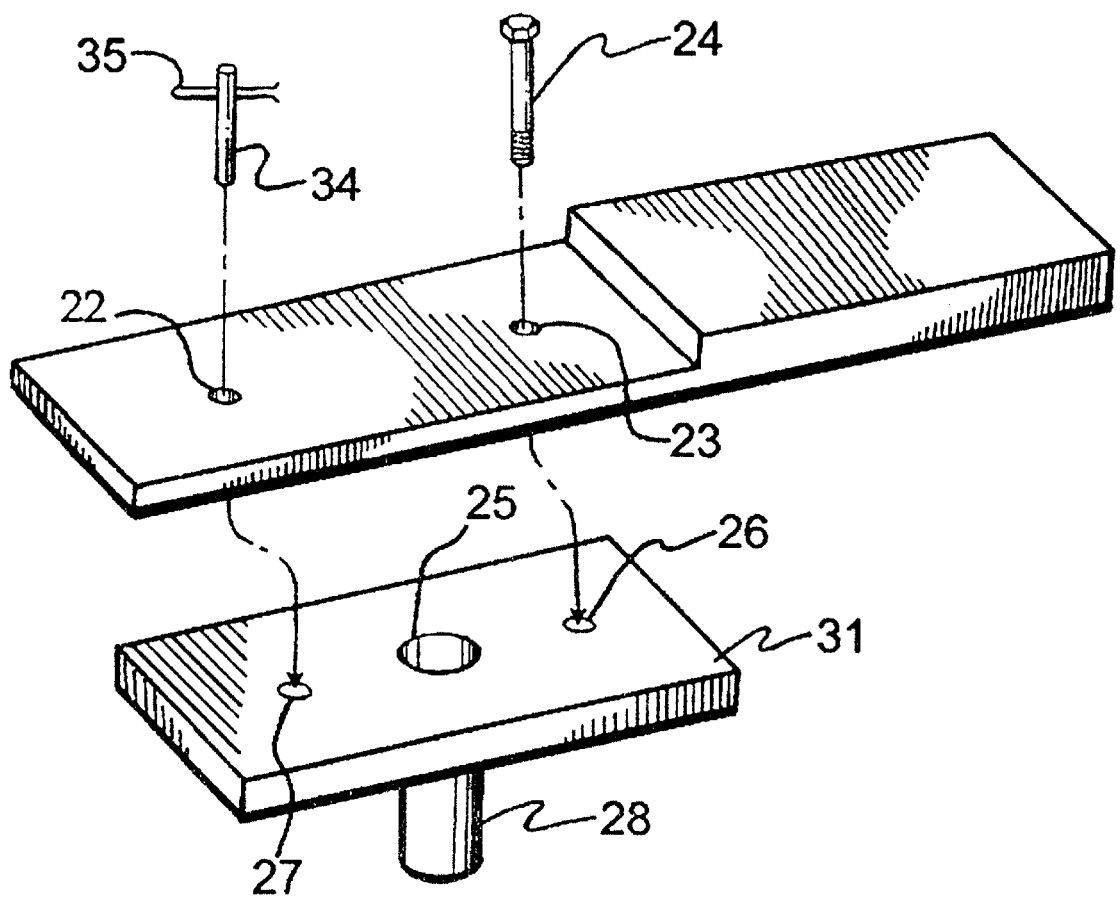
Figure 2:
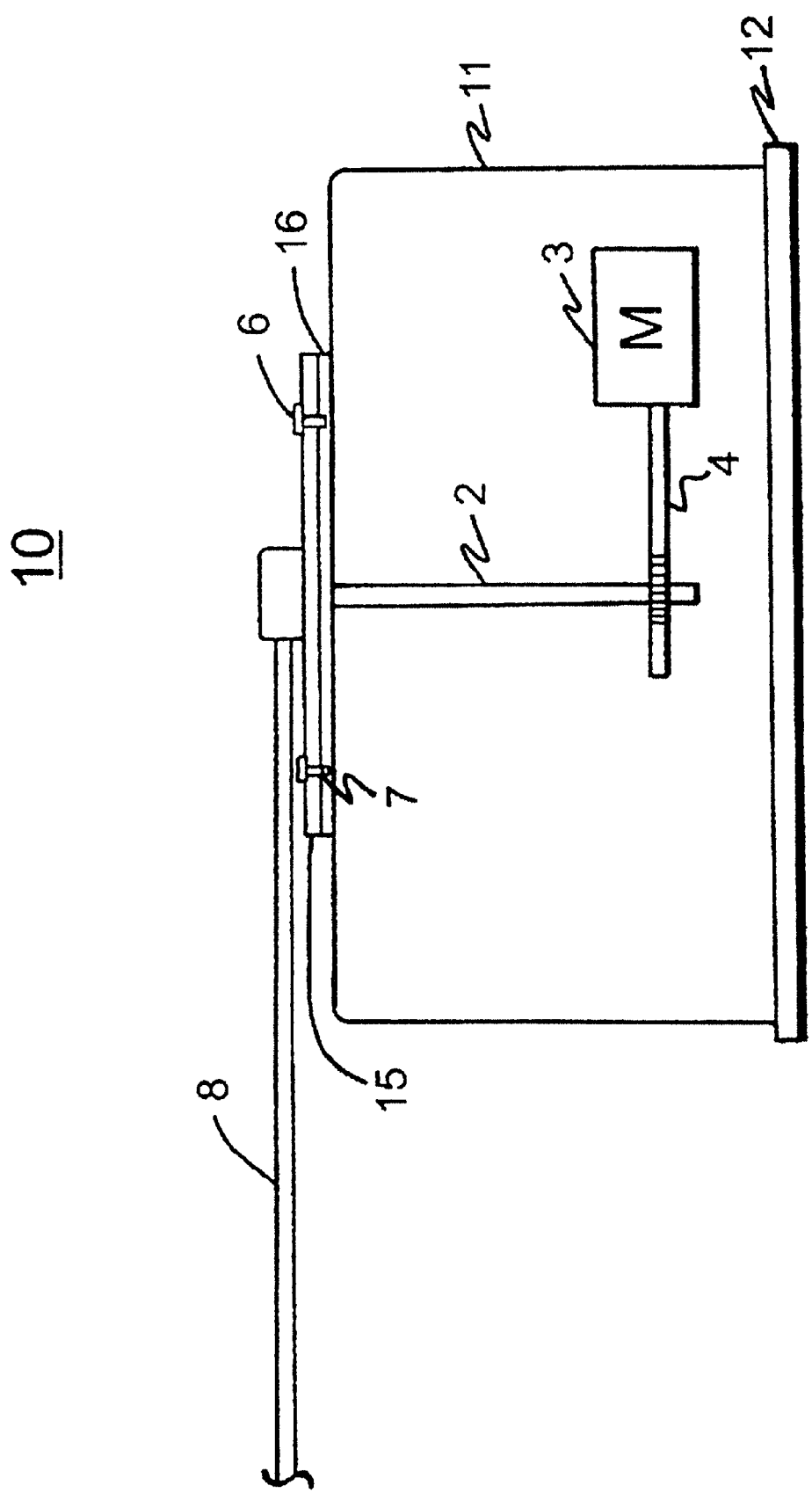
Figure 3:
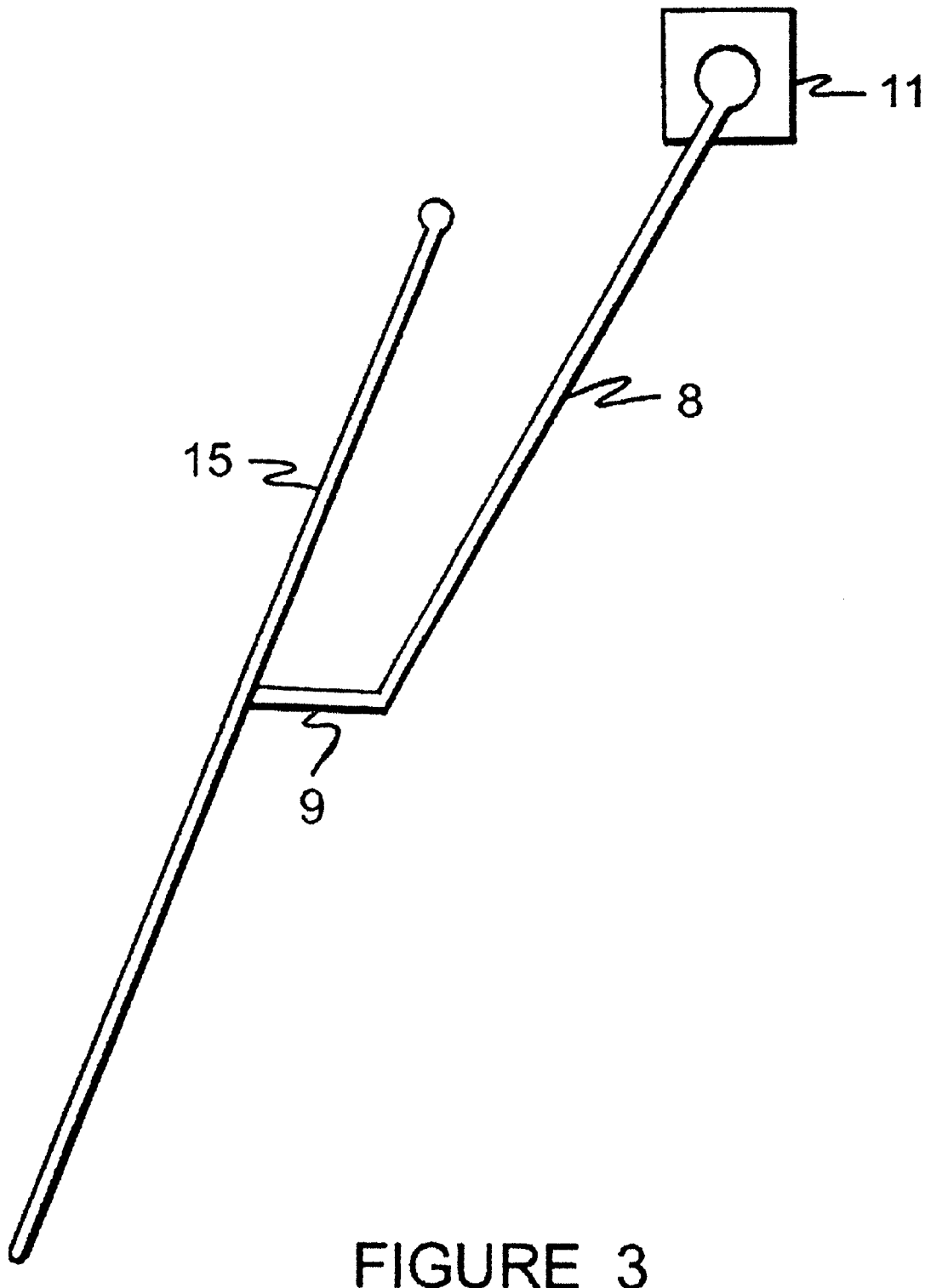

Having thus described the invention in general terms, reference will now be made to the accompanying drawings (three sheets) in which:

FIG. 1 is a fragmentary side-elevational view showing a gate opening apparatus slave actuator constructed in accordance with and embodying the present invention;

FIG. 2 is a fragmentary side-elevational view showing a gate opening break away apparatus with a slave actuator constructed in accordance with and embodying the present invention; and FIG. 3 is a top-plan view of the break away apparatus of FIG. 2. with a gate drive member.

DETAILED DESCRIPTION

Referring now in more detail and by reference characters to the drawings which illustrate a practical embodiment of the present invention, in FIG. 1, a slave actuator 30 of the present invention is shown with a desired dimension of approximately 22 inches in length with a varied thickness of approximately 1½ inches including two annular penetrations, one designated for inclusion of a shear pin 34 with a cotter key 35 and a second annular penetration for a pivot bolt 24. The slave actuator 30 fits on a mechanism to open a gate as described further. A primary gate actuator base 31 includes a shaft annular space for engaging a shaft 28 from a motive drive mechanism normally including an electrical motor for axial movement of the shaft 28 of the motive drive mechanism to drive a gate open or closed. In operation, on loss of power to the motive drive mechanism motor, the gate will remain closed and be forced closed by the loss of motive power. However, on an emergency access a force applied against the gate will provide sufficient torque on the slave actuator 30 to shear apart, or break away shear pin 34 thereby allowing the slave actuator 30 to rotate around pivot bolt 24 and allow manual opening of the gate. The gate may be of any conventional construction and, as such, does not form part of the present invention per se. In essence, gates of this type are typically used in security apartment buildings and similar commercial establishments and dwelling structures. The access opening permits passage of either people or vehicles, and the gate can be shifted from the closed to the opened position for such access. As used herein, the term "gate" is used in its generic sense to include doors and like structures, and essentially constitutes any movable framework or structure which controls the entrance or exit through an access opening to provide passageway. The slave actuator 30 is further described as a mechanism termed break away apparatus 10 of FIG. 2.

A break away apparatus 10 is illustrated in FIG. 2 used for shifting a gate from a closed position to an open position and from the open position back to the closed position with respect to an access opening. The break away apparatus 10 generally comprises a housing 11 along with a motive means 3, such as an electric motor, operatively associated with the housing 11. A drive member 8 is operatively connected to the motive means 3 and is capable of being connected to a gate for causing rotating movement of the gate. Typically the drive member is connected to the motive means 3 by means of a drive shaft 2 that extends through the housing 11.

The break away apparatus 10 includes a locking mechanism which is operatively associated with the drive member for preventing rotating movement of the gate when the motive means is not energized. Moreover, a locking mechanism comprises a top drive plate 15 that is adapted to be operated so that it is locked in place by release member 7 and pivot bolt 6 in order to permit movement of the gate when the motive means 3 is energized.

The break away apparatus 10 comprises a manually operable release member 7 which is operatively connected to the locking mechanism comprised of top drive plate 15 locked onto base plate 16 and to the drive member 8. The release member 7 functions as part of an override means and is capable of unlocking the locking mechanism of the top drive plate 15 and base plate 16 and substantially simultaneously operatively disconnecting the drive member 8 from the motive means 3, and more particularly disconnecting the drive member 8 from the drive shaft 2.

In this embodiment of the invention, the locking mechanism uses a locking pin or locking rod as a release member 7. The locking pin or locking rod is adapted to be essentially operable with the energization of the motive means 3 or so as to move the drive member 8 with the locking rod to form a locking position with the drive member 8. When the motive means 3 is de-energized, and in an emergency situation, the locking pin or locking rod is adaptable to shear and disengage the drive member 8 from the motive means 3 thereby permitting the gate to be opened manually.

As indicated above, the drive member 8 is effectively operatively disconnected from the motive means 3 when the locking pin or locking rod is sheared and the gate is actuated manually. This is accomplished by means of a top drive plate 15 mounted on base plate 16 to the motive means 3 which axially turns to open the gate in relationship to the drive shaft 2. Consequently, a drive shaft is 2 disengaged from the motive means 3 and allows for rotation of the gate drive member 8 disengaged from the drive means 3 and allow manual opening of the gate on loss of electrical power. Thus, when the release mechanism is actuated by shearing of the locking pin or locking rod, the drive shaft 2 would be displaced axially from the motive means 3, thereby allowing the gate drive shaft to displace and allow manual movement or opening of the security gate.

In another embodiment of the invention, the release member 7 may be manually operable as aforesaid and may be located on top or one side of the housing 11 with respect to the drive member 8. Thus the drive member 8 will be located on top of the housing 11 on a base plate 16 which fits on top of the motive top drive plate 15 which rotatably moves axially to extend the drive member 8 and open the security gate. This is advantageous in that it provides a safety feature on loss of electrical power for access of fire department vehicles or emergency vehicles in general. The gate is therefore not locked in position from loss of electrical power to the motive means 3 of the gate operator drive member 8. Moreover, by locating the top drive plate 15 with the locking pin or locking rod on top of the motive means 3 housing 11 and with respect to the release means 7 being an inexpensive nylon locking pin or locking rod, the construction is greatly simplified and in addition, cost of construction is substantially reduced.

In one preferred embodiment one top drive plate 15 is located on top of a base plate 16 designed to fit a release member 7 with threads to engage onto base plate 16 as shown in FIG. 2. The top drive plate 15 and base plate 16 are adapted with a circular hole on top drive plate 15 and with a threaded boring on base plate 16 to engage a release member 7 and pivot bolt 6. On loss of electrical power to the motive drive 3 mechanism, the top drive plate 15 is subject to manual force, in an emergency situation to open the gate, the force shears the locking pin thereby allowing movement of the top drive plate 15 on base plate 16 of the motive drive housing 11 allowing the gate to open. The locking pin is fabricated from a soft nylon or polyethylene material of a specified shear strength to allow normal gate closure and opening in regular use. On loss of electrical power to the motive drive 3 mechanism, it may be necessary to allow emergency vehicles into an area secured by the utility gate and a specific manual force can be applied to the gate itself, transferring this force to the top drive plate shearing the release member 7 and pivoting the top drive plate 15 on base plate 16 by means of pivot bolt 6 allowing the gate to open by disengaging the top drive plate from the locked position of normal operation. The force transmitted by the drive member 8 will apply axially onto the motive drive 3 mechanism plate thereby causing the shear locking pin to shear and allow axial movement of the plate, thereby releasing the gate and allow entry into the secured area. The force on the gate will allow rotation into a release position and allow entry into the secured space. The shearing of the locking pin is adapted to cause an axial displacement of the top drive plate to thereby operatively disconnect the drive shaft 2 from the drive member 8, when the release member 7 shear locking pin is sheared in two and the gate is shifted to the override open position.

A normal configuration of a motive drive mechanism shown from a top plan view in FIG. 3 includes a top plate 15 which supports the gate drive member 8. Axial rotation of the top motive drive plate 15 guides the gate into an open or closed position by the motive drive mechanism 5. Referring to FIG. 2 the present invention provides for a second base plate 16 which fits the configuration of the first motive top drive plate 15. The top drive plate 15 is drilled or fitted with two circular holes to allow penetration of the shear locking pin release member 7 in the first hole and a threaded pivot bolt 6 in the second hole. The shear locking pin release member 7 is also threaded to fit into the second base plate 16. The two threaded fittings on the second base plate 16 allow for a secure connection of the plates to transfer axial movement from the first top drive plate 15 driven by the motive means 3 drive mechanism to the second base plate 16 which is connected to the drive member 8 of the motive drive 3 mechanism. The two plates are engageably connected to interact as one plate and thereby transfer the axial movement of the motive drive 3 mechanism. The first top drive plate 15 and second base plate 16 are designed so as to cooperate mechanically with each other. The first threaded hole on the first plate will fit the shear locking pin release member 7 and the second threaded hole will fit the permanent engaging pivot bolt 6 to secure the second base plate 16 to the first top drive plate 15. The motive means 3 drive mechanism will turn the first top drive plate 15 in an axial motion with the second base plate 16 following the same motion from the motive means 3 drive mechanism. Consequently, when the base plate 16 is rotated, the total amount of displacement is transmitted to the top drive plate 15 which is engaged with the motive means 3 drive mechanism drive member 8. The motion of the motive means 3 drive mechanism is transferred to the drive member 8 and thereby moves the gate into an open or closed position.

Referring to FIG. 2 the break away apparatus 10 generally comprises a motive means 3 such as an electric motor which may be suitably mounted on the housing 11. The electric motor may be adapted for operation on conventional household current, such as 110 v. A.C., power. The motor is illustrated as being mounted on the upper end of the housing 11. In addition, the housing 11 itself is secured to a mounting plate 12. The housing 11 preferably contains a gear drive train 4 so as to translate the rotational power delivered from the motor through a motor output shaft 2 as more fully illustrated in FIG. 2. In this case, the motor output shaft 2 would be connected to the drive shaft 8 through a conventional gearing mechanism (not shown). Typically, a reduction gear train would be located within the drive housing 11.

Referring to FIG. 2 in normal operation of the break away apparatus 10, that is, in times where there are not emergency conditions, the override mechanism is not used, and hence the shear pin 7 release member will remain in the position as illustrated in FIG. 2, such that the top drive plate 15 and the base plate 16 are coupled to the motive means via output shaft 2, such that they in turn, are coupled to the drive member 8 so as to be rotatable therewith. Thus, upon receipt of the signal, as for example, a key operated lock, which permits energization of the motor or motive means 3, the motor will cause the drive train 4 to cause rotation of the drive member 8. Moreover, energization of the motor for causing rotation of the drive member 8 will also simultaneously move the gate engaged by drive member 8.

In the event of a power failure or other emergency condition, in which the motive means 3 is not operated, or due to some other failure of the apparatus, it is possible to override the apparatus merely by turning the gate manually and applying torque sufficient to shear the shear pin release member 7 and release the top drive plate 15 hingeably rotating on pivot bolt 6 thereby allowing rotation of the gate to open. In this case, access is allowed to emergency vehicles with minimum disruption and delay.

Thus, there has been illustrated and described a unique and novel gate opening and closing apparatus and method for substantially simultaneously controlling a coupling of a gate to a motor means and a locking means to prevent and permit movement of such gate. This apparatus and method therefore fulfills all of the objects and advantages sought therefor. It should be understood that many changes, modifications, variations, and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. An apparatus for shifting a gate from a closed position to an open position on loss of a driving means comprising:
   (a) a housing,
   (b) said driving means associated with said housing,
   (c) a drive member operatively connected to said driving means and capable of being connected to a gate for causing shifting movement of same,
   (d) a locking mechanism operatively associated with said drive member,
   (e) a manually operable release member operatively connected to said locking mechanism,
   (f) a drive shaft operatively connected to said driving means and being rotatable by said driving means, said drive member being operatively connected to said drive shaft and rotatable thereby, said drive member being disconnected from said drive shaft upon actuation of said release member,
   (g) said release member being located on a drive plate engagingly connected to a base plate, and
   (h) said release member comprises a shear pin of a material which allows a shearing effect on a specified torque or force, said shear pin adapted to break or shear to disengaging the drive member from said driving means when said shear pin is sheared.

2. The apparatus of claim 1 further characterized in that the drive plate and base plate are connected by a mounting bolt opposite the shear pin.

3. The apparatus of claim 2, further characterized in that the drive plate will rotate on the mounting bolt allowing the drive plate to disengage from the base plate for permitting shifting movement of the gate.

4. The apparatus of claim 3 wherein the drive plate is engaged and connected to a said drive member.

5. The apparatus of claim 4 wherein the base plate becomes operatively disengaged from said drive shaft upon actuation of said release member.

6. The apparatus of claim 5 further characterized in that said gate is adapted to be rotated hingeably from a closed position rotating on the axis of the mounting bolt fitted to the drive plate and base plate.

7. An apparatus for shifting a gate from a closed position to an open position on loss of a driving means comprising:
   a housing;
   said driving means carried by said housing,
   a drive shaft coupled to and rotatable by said driving means;
   a drive member coupled to said drive shaft and capable of being connected a gate for causing shifting movement of same;
   a base plate coupled to the drive shaft;
   a drive plate coupled to the drive member and pivotally coupled to the base plate; and
   a shear pin engaging the drive plate and the base plate, preventing relative pivoting thereof, the shear pin being of a material which allows a shearing effect on a specified torque or force, said shear pin adapted to break or shear allowing relative pivotal movement of the drive plate and the base plate.

* * * * *